Figure 1:
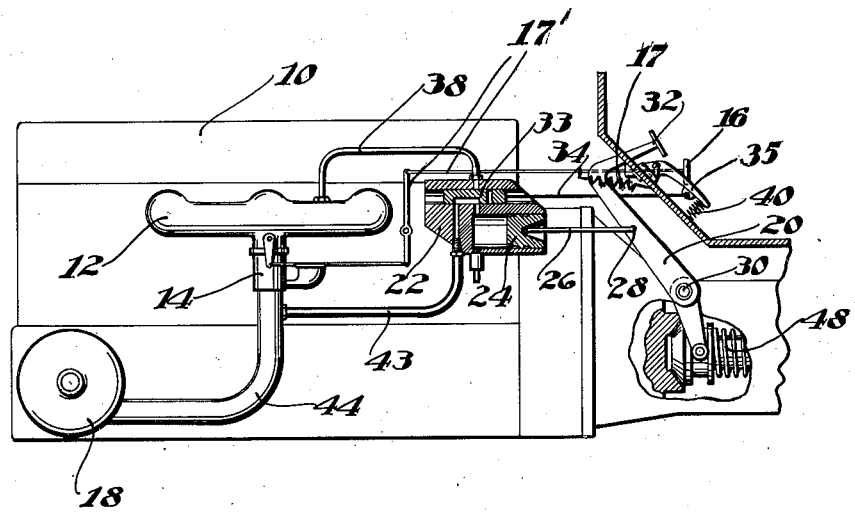

Nov. 26, 1935.    C. S. BRAGG    2,022,026
CLUTCH CONTROLLING MECHANISM
Original Filed June 1, 1931

INVENTOR.
CALEB S. BRAGG
BY
ATTORNEY.

Patented Nov. 26, 1935

2,022,026

UNITED STATES PATENT OFFICE 2,022,026

CLUTCH CONTROLLING MECHANISM

Caleb S. Bragg, Palm Beach, Fla., assignor to Bragg-Kliesrath Corporation, Long Island City, N. Y., a corporation of New York Application June 1, 1931, Serial No. 541,206
Renewed April 19, 1935

17 Claims. (Cl. 192—.01)

This invention relates to power operated mechanism, and more particularly to the clutch mechanism of an automotive vehicle. The invention is, however, equally adaptable to clutch mechanism in general wherein the torque of the driving element of the clutch is of considerable magnitude at its maximum.

The increasingly heavy vehicles of the day give rise to new problems in operation and control of their various mechanisms. Particularly is this true of the massive trucks and busses with their high horsepower motors, which motors may be provided with superchargers to gain this relatively greater power output. The maximum torque developed by such motors necessarily calls for very heavy clutch springs to at all times keep the clutch plates in engagement to transmit the power from the driving to the driven element. It is with a view, therefore, to supplementing the affect of the clutch spring or springs, in a motor provided with a supercharger or equivalent device providing superatmospheric manifold pressure, that the present invention is designed.

A further object of the invention resides in the provision of an engine operated servo motor, controlled by a manually operated valve, the driving element of the motor being so designed and so connected to the conventional clutch pedal as to impose, during the operation of the supercharger, a clutch engaging load upon the pedal, additive of the load of the conventional clutch spring.

In the attainment of the above objects there is suggested a supercharger operated fluid motor, the casing of which is preferably rigidly secured to a member, such as the engine casing, the piston of the motor being secured to the clutch pedal, power loading the latter at open throttle or otherwise during the operation of the supercharger.

A further feature of my invention lies in the manner of effecting the disengagement of the clutch plates. Relative to this phase of the clutch control it is, of course, desirable to relieve the operator of the effort necessary to disengage the clutch. This result is obtained by the operation of the same valve employed to control the aforementioned clutch engaging operation, the actuation of the valve serving to place the manifold in circuit with the motor. With the throttle closed the air within the motor is quickly evacuated and the movement of the piston reversed to release the clutch.

Further objects of the invention are to provide an economical type of servo mechanism from the manufacturing, installation and service standpoints, and one which will compensate for the space limitations of the conventional throw-out clutch lever and at the same time supplement the clutch controlling effect of the clutch spring in the manner described; thereby permitting a reduction in strength, size, cost, etc., of the latter.

In order that the invention in its various aspects may be readily understood and appreciated by those skilled in the art, there is disclosed and described one structural embodiment thereof. It will be readily appreciated, however, that the description and drawing are illustrative only and are not to be taken in an unnecessarily limiting sense.

Figure 2:
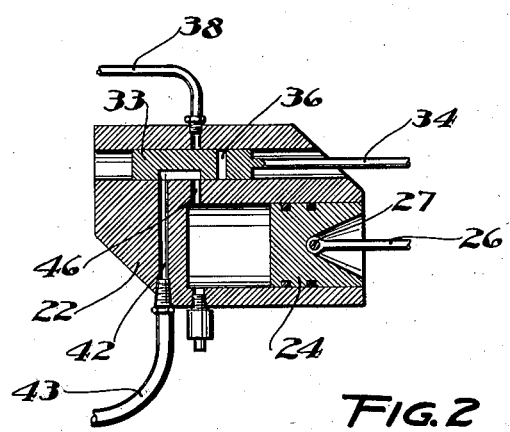
Figure 3:
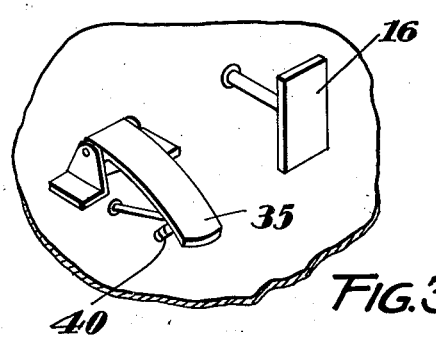

In the drawing, Figure 1 is a side elevation of the engine and clutch parts of an automotive vehicle disclosing my novel power means for operating the clutch;

Figure 2 discloses in section the valve and servo motor mechanism of Figure 1, and Figure 3 is a perspective plan view of the structure of Figure 1 disclosing the relative position of the control pedals.

Referring now to the structure disclosed in Figure 1, there is provided, in combination with a conventional internal combustion engine 10 with its intake manifold 12, throttle control suction passage 14 and throttle controlling accelerator pedal 16, returned to its off position by spring 17 and connected to the throttle by linkage 17'. There is also disclosed a continuously driven supercharger mechanism 18 and a conventional manually operated clutch throw-out lever 20. There is also disclosed a power mechanism co-operating with both clutch and engine in a manner to be described in detail hereinafter.

The power unit comprises a fluid operated motor including a cylinder or casing 22 rigidly secured to the engine case, or other convenient mounting rigidly secured to the chassis. The piston 24 of the motor is provided with the usual connecting rod 26, the latter being pivotally connected to the piston at 27 and also pivotally secured at 28 to the clutch throw-out lever 20 intermediate its fulcrum or pivotal mounting 30 and foot pad 32.

The operation of the servo motor is controlled by a valve mechanism mounted thereon as clearly disclosed in Figure 2. The valve is preferably of the slide type consisting of a piston member 33 which is preferably connected by link 34 to a miniature clutch control pedal 35, the valve being operative to place the manifold 12 in circuit with the motor by registering a duct 36 in the member 33 with a conduit 38, the latter interconnecting the manifold and valve casing. The accelerator pedal 16 and the clutch control pedal 35 are spaced from each other and independently operated. In the normal clutch engaged position of the parts the pedal 35 is maintained in an "off" position by compression spring 40 and in this position the piston valve member 33 intercommunicates a duct 42 in the valve casing with a conduit 43, connected to the supercharger conduit 44, and with a duct 46, the latter intercommunicating the bore of the servo motor and a recess in the valve member.

Passing now to the objects of the invention, the conventional clutch spring 48, in order to maintain the clutch plates in non-slipping engagement during the transmission of the driving torque, must necessarily be very strong and capable of storing sufficient potential energy to meet the demands imposed. This is particularly true of the high horsepower motors of the day, constituting the power plants of the large busses and trucks. The power of such motors may be stepped up by the use of the supercharger 18 disclosed in Figure 1.

The servo motor disclosed in Figure 1 is, therefore, designed to supplement, during the operation of the supercharger, the load derived from the clutch spring 48, thereby permitting a reduction in size, strength, etc., of the spring. As the accelerator 16 is operated to increase the speed of the car, the supercharger is automatically and progressively cut in and the servo motor, being at such time in communication with the supercharger conduit, is consequently automatically energized. This energization of the motor is due to the pressure differentials set up on the opposite sides of the piston 20, the inner side being subjected to the superatmospheric pressure developed by the supercharger and the outer side being subjected to the existing and substantially constant atmospheric pressure.

The piston is thus automatically subjected to a force placing the rod 26 in compression, whenever the throttle valve is opened and the supercharger is operated, the degree of gaseous pressure in the motor being directly a function of the degree of operation of the supercharger and indirectly a function of the degree of operation of the throttle valve.

The load from the servo motor upon the clutch plates is, therefore, automatically and progressively increased as the throttle is opened and the supercharger cut in; but with this increase in pressure there is an increased power output from the engine motor, and it is at this time that the clutch plates should be most firmly forced into engagement to obviate slipping. The invention thus serves this purpose, the power load on the clutch plates automatically and proportionately increasing as the driving torque of the engine increases.

It is also to be noted that as the throttle control and supercharger effect are cut down to reduce the power output of the engine that the power load upon the clutch plates is automatically and progressively reduced, which permits easier manual clutch disengagement by virtue of the fact that the clutch spring 48 is, by design, made relatively weak, or rather just strong enough to maintain the clutch in non-slipping engagement at closed throttle.

Referring now to the second phase of the invention, namely, the clutch releasing operation, the pedal 35 is moved downwardly when it is desired to disengage the clutch. This places the motor in circuit with the manifold, as previously described, and with the engine idling, which is the usual condition at the time of clutch release, the manifold vacuum developed serves to draw the piston 24 inwardly and disengage the clutch plates. After the gear shift is made the pedal 35 is released, moving the piston valve member 33 into its "off" position to again charge the motor by the supercharger and permit the clutch spring to reengage the plates.

There is thus provided a very simple servo motor structure, which functions, in cooperation with a supercharger, the engine manifold, engine throttle control structure and but one servo motor control valve, as a clutch control mechanism for both engaging and releasing operations.

It will be understood that while the illustrated embodiment of the invention is described as shown, a considerable latitude is to be permitted in construction within the range of the claims and scope of the invention. It is also within the purview of my invention to employ its advantages in mechanisms other than the automotive vehicle; for example, the principles may be employed in any power take-off employing driving and driven elements operating in conjunction with a supercharger, and furthermore the source of power for power loading the clutch plates may be derived from any source of superatmospheric pressure other than the supercharger.

I claim:

1. In an automotive vehicle, the combination with an internal combustion engine having an intake manifold, a throttle and a supercharger cooperating therewith, a clutch mechanism and power operated means for controlling the operation of said clutch mechanism, said means having a connection with both supercharger and manifold, of a common valve mechanism for controlling the operation of said power means to selectively render said means operative to either engage or disengage the clutch mechanism.

2. In an automotive vehicle, the combination with an internal combustion engine having an intake manifold, a throttle and a supercharger, a clutch mechanism and servo motor means for controlling the operation of said clutch mechanism, said servo motor means being in communication with both supercharger and manifold, of a slide valve mechanism mounted on said servo motor and selectively controlling the operation of said motor to render the latter operative to either engage or disengage the clutch mechanism.

3. In an automotive vehicle having a clutch mechanism, an internal combustion engine having an intake manifold, an accelerator controlled throttle mechanism and a supercharger mechanism driven by said engine, said supercharger cooperating with said throttle mechanism and manifold, together with a fluid motor in communication with said manifold and valve mechanism for controlling the operation of said motor, the latter rendered operative during the operation of said throttle and supercharger.

4. In an automotive vehicle having a clutch mechanism and an internal combustion engine, said engine having an intake manifold and a supercharger cooperating therewith, a servo motor operably connected to said clutch mechanism, means for intercommunicating said manifold and motor and other means for intercommunicating said supercharger and motor.

5. In an automotive vehicle having a clutch mechanism and an internal combustion engine, said engine having an intake manifold and a supercharger cooperating therewith, a servo motor operably connected to said clutch mechanism, means for interconnecting said manifold and motor, other means for interconnecting said supercharger and motor and valvular means for selectively placing said motor in circuit with either the manifold or the supercharger.

6. In an automotive vehicle provided with a clutch mechanism, an internal combustion engine and means for controlling the operation of said engine, a supercharger, a servo motor operably connected to said clutch mechanism, means interconnecting said motor and supercharger and a valve means cooperating with said engine controlling means for rendering said motor operative to disengage the clutch, said valve means in its off position permitting engagement of the clutch by said motor.

7. In an automotive vehicle provided with a clutch mechanism, an internal combustion engine and means for controlling the operation of said engine, a supercharger, a servo motor operably connected to said clutch mechanism, means interconnecting said motor and supercharger and a slide valve mounted on said motor, said valve cooperating with said engine controlling means for rendering said motor operative to disengage the clutch and further cooperating with said engine controlling means, in the off position of the valve, to engage the clutch.

8. Clutch operating mechanism for an automotive vehicle comprising, in combination with a clutch structure, a pressure differential operated motor, connections between the motor and clutch adapted to alternately actuate the driven element of the clutch to disengage and engage the same, a source of superatmospheric pressure and a source of subatmospheric pressure, separate fluid transmitting connections interconnecting each of the aforementioned sources of pressure with the clutch motor, and means, under the control of the driver, selectively operable to energize said motor, through the medium of said pressure sources, to either engage or disengage the clutch.

9. Clutch operating mechanism for an automotive vehicle comprising, in combination with a clutch structure and an internal combustion engine, a clutch operating servo motor, connections between the motor and clutch adapted to positively disengage and engage the latter, a source of superatmospheric pressure and a separate source of subatmospheric pressure, both power sources resulting from the operation of the engine as a prime mover, fluid transmitting connections interconnecting each of the aforementioned power sources with the clutch motor, and a single valve means, operable by the driver, said valve being selectively operable to energize said motor, through the medium of said pressure sources, to either disengage or engage the clutch.

10. Clutch operating mechanism for an automotive vehicle comprising, in combination with a clutch structure and the internal combustion engine of the vehicle, a pressure differential operated motor, connections between the motor and clutch adapted to either positively disengage or engage the latter, fluid transmitting connections between said engine and motor, the former constituting a prime mover or source of energy for energizing the motor to either positively engage or positively disengage the clutch.

11. In an automotive vehicle provided with a clutch mechanism, a pressure differential operated motor, a force transmitting connection between said motor and clutch, and sources of fluid pressure, under the control of the operator of the vehicle and during the operation of the vehicle, to selectively energize the motor to alternately place the force transmitting connection either in tension or compression to positively and successively engage and disengage the clutch.

12. In an automotive vehicle provided with a clutch mechanism, a single chambered pressure differential operated motor for operating said clutch mechanism, said motor comprising a cylinder and a reciprocable piston therein, the latter being operatively connected with the clutch, superatmospheric and subatmospheric sources of fluid pressure, and means, under the control of the operator of the vehicle and operable during the operation of the vehicle, for selectively varying the gaseous pressure within the chamber of said motor, through the medium of said sources of pressure, to thereby energize the motor to either positively engage or positively disengage the clutch.

13. In an automotive vehicle, the combination with an internal combustion engine, a supercharger driven thereby, and an engine controlled source of vacuum, of a clutch mechanism, a pressure differential operated motor operably connected to said clutch mechanism, fluid transmitting connections interconnecting said motor with said supercharger and vacuum source, and a valve, selectively operable at the will of the driver, to connect said motor with either the source of vacuum or supercharger.

14. In an automotive vehicle, the combination with a clutch and a pressure differential operated motor for operating said clutch to either positively engage or disengage the same, of an intake manifold providing a source of vacuum and an engine driven supercharger, and means operable by the driver for selectively connecting said motor with either the manifold or supercharger.

15. Power mechanism for operating the clutch of an automotive vehicle comprising a single-ended pressure differential operated motor, separate sources of subatmospheric and superatmospheric pressure, separate fluid transmitting connections, each interconnecting the closed end of said motor with a source of power, and a single valve means selectively operable to interconnect one or the other of said power sources with said motor to energize the latter and either engage or disengage the clutch.

16. In an automotive vehicle provided with an internal combustion engine, a throttle, a clutch, a pressure differential operated power means for operating said clutch, an engine controlled source of superatmospheric pressure and an engine controlled source of subatmospheric pressure, manually operated means operable by the driver for controlling said throttle to vary the power of said aforementioned power sources, a valve means for controlling the operation of said pressure differential operated power means, and manually operable means, also operable by the driver and separate from said aforementioned manually operable means, for controlling the operation of said valve means, the operation of said manually operable means being so coordinated as to effectively control the operation of said differential power means.

17. In an automotive vehicle provided with an internal combustion engine having an intake manifold, an acelerator, a throttle, means interconnecting said throttle and accelerator, a clutch, a pressure differential operated motor for operating said clutch, an engine driven supercharger, a fluid transmitting connection interconnecting the supercharger with said motor, a second fluid transmitting connection interconnecting said manifold and motor, a valve means for selectively interconnecting said motor with said manifold or supercharger by means of said fluid transmitting connections, and manually operable means, separate from the accelerator pedal and operable by the driver, for operating said valve to selectively energize said motor to either positively engage or disengage the clutch.

CALEB S. BRAGG.